United States Patent
Buisson et al.

(10) Patent No.: US 12,424,114 B2
(45) Date of Patent: Sep. 23, 2025

(54) METHOD AND APPARATUS FOR OPERATING AN AIRCRAFT HAVING TWO ENGINES

(71) Applicants: Airbus SAS, Blagnac (FR); Airbus Operations Limited, Bristol (GB); Airbus Operations SAS, Toulouse (FR)

(72) Inventors: Marcellin Buisson, Blagnac (FR); Dylan Reynolds, Bristol (GB); Jerome Gouillou, Toulouse (FR); Gabriel Loupiac, Toulouse (FR); Kiran Kumar Chippa, Blagnac (FR)

(73) Assignees: Airbus SAS, Blagnac (FR); Airbus Operations Limited, Filton Bristol (GB); Airbus Operations SAS, Toulouse (FR)

( * ) Notice: Subject to any disclaimer, the term of this patent is extended or adjusted under 35 U.S.C. 154(b) by 301 days.

(21) Appl. No.: 18/170,910

(22) Filed: Feb. 17, 2023

(65) Prior Publication Data
US 2023/0260412 A1    Aug. 17, 2023

Related U.S. Application Data

(60) Provisional application No. 63/311,129, filed on Feb. 17, 2022.

(51) Int. Cl.
*G08G 5/51*    (2025.01)
*G08G 5/30*    (2025.01)

(52) U.S. Cl.
CPC .............. *G08G 5/51* (2025.01); *G08G 5/30* (2025.01)

(58) Field of Classification Search
CPC ... G08G 5/51; G08G 5/30; G08G 5/21; Y02T 50/80
See application file for complete search history.

(56) References Cited

U.S. PATENT DOCUMENTS

| | | | |
|---|---|---|---|
| 8,109,464 B2* | 2/2012 | Bhargava | B64D 41/00 244/50 |
| 9,688,392 B2* | 6/2017 | Kawalkar | B64D 31/04 |
| 2013/0057414 A1* | 3/2013 | Nutaro | G08G 5/21 340/958 |
| 2015/0375853 A1* | 12/2015 | Kawalkar | B64D 31/06 244/50 |
| 2016/0140855 A1* | 5/2016 | Gannon | G08G 5/21 701/533 |
| 2016/0328977 A1* | 11/2016 | Lueck | G01C 21/20 |
| 2016/0343262 A1* | 11/2016 | Auletto | G01C 21/3438 |
| 2017/0008618 A1* | 1/2017 | Cox | B64C 25/405 |
| 2017/0032687 A1* | 2/2017 | Lamkin | G08G 5/727 |
| 2017/0240269 A1* | 8/2017 | Cox | B64D 31/00 |
| 2019/0172361 A1* | 6/2019 | Schwindt | G08G 5/21 |
| 2019/0189018 A1* | 6/2019 | Marik | B64F 1/002 |

(Continued)

*Primary Examiner* — Rami Khatib
(74) *Attorney, Agent, or Firm* — Greer, Burns & Crain, Ltd.

(57) ABSTRACT

Processes and systems for operating an aircraft having a first engine and a second engine, a non-transitory computer readable media comprising computer executable instructions that when executed cause a processor to execute the steps of the present processes. A plurality of taxiways are determined and zones for changing to or from single engine taxing operations are also determined and displayed. Additionally, countdown timers for takeoff or engine shutdown may be displayed.

17 Claims, 12 Drawing Sheets

(56) References Cited

U.S. PATENT DOCUMENTS

| | | | |
|---|---|---|---|
| 2021/0134167 A1* | 5/2021 | Erignac | G08G 5/51 |
| 2021/0206479 A1* | 7/2021 | Cox | B64D 31/18 |
| 2022/0005364 A1* | 1/2022 | Wang | G08G 5/51 |
| 2022/0307853 A1* | 9/2022 | Davis | G01C 21/3492 |
| 2023/0066629 A1* | 3/2023 | Belamkonda | G08G 5/51 |
| 2023/0133862 A1* | 5/2023 | Baudin | G08G 5/21 701/3 |

* cited by examiner

METHOD AND APPARATUS FOR OPERATING AN AIRCRAFT HAVING TWO ENGINES

RELATED APPLICATIONS

This application claims priority to U.S. Provisional Patent Application No. 63/311,229 filed on Feb. 17, 2022, the entirety of which is incorporated herein by reference.

FIELD OF THE INVENTION

The present invention relates to operation of a two (or more) engine aircraft, and more particularly, for determining a time for turning on the second engine prior to take off and turning off the engine subsequent to landing.

BACKGROUND OF THE INVENTION

To reduce fuel consumption during the taxi phase of an aircraft it is known to operate in an operation mode sometimes referred to as "Single Engine Taxi" ("SET"). Operating in SET must be done when safe to do so. In certain operational conditions, particularly taxing out to a runaway ("SET OUT"), it can be a complex decision on whether to perform the procedure and, if so, when and where to perform the procedure. The more often is it performed and the longer term operating in SET the more fuel is saved.

When deciding to perform SET OUT the second (off) engine needs to be turned on before takeoff To ensure this does not delay takeoff, which would have traffic and fuel burn impacts, this second engine must be started with enough time to achieve warm up before entering the runway for takeoff If the crew turns on the second engine too soon, the fuel consumption increases. If the crew turns on the second engine too late, the aircraft needs to stay at a holding point prior to entering the runway while they wait for the second engine to warm up enough to takeoff This generates unnecessary traffic and exposes the crew to miss their takeoff slot.

When deciding to perform SET while taxing after landing ("SET IN") the second (on) engine must be turned off after landing only after it achieves thermal stabilization and when turning it off is not a safety issue. If it remains on for longer than necessary, fuel is wasted.

Pilots currently have no support to take SET operations related decisions. They must decide if the conditions are safe for SET. They must decide when to turn on or off the engines. They lack data that could enable them to operate in SET safely and, thus conserve fuel and reduce emissions.

In addition to the lack of support for SET operations, due to the operational complexity many pilots and airlines choose not to perform SET. This is particularly true of SET OUT operations.

Therefore, it would be desirable to provide information which allows for the SET operations to be performed more effectively and efficiently.

SUMMARY

The present invention provides methods and devices for aiding in the operation of an aircraft in SET operations. The present invention determines where and/or when to start a second engine while respecting the mandatory warm-up time before take-off Additionally and/or alternatively, the present invention indicates that the second engine may be shut down while respecting the mandatory cool down time for thermal stabilization of the engine.

The processes of the present invention could be carried out in the Electronic Flight Bag (EFB) and/or in the aircraft avionics. It is believed that the former being a faster to market and more flexible means; however, both are contemplated. In both cases, the present invention may utilize the capabilities of the Airport Moving Map (AMM). The aircraft may communicate data to the EFB, such as position or other supplementary information. However, the EFB may also provide functionality independently of this data.

Accordingly, in one aspect, the present invention may be generally characterized as providing a method operating an aircraft having a first engine and a second engine comprising by: determining a plurality of taxi paths for the aircraft to take, each path comprising a takeoff taxi path or a landing taxi path; determining a zone for each taxi path where, when the taxi path is a takeoff taxi path, the second engine may be turned on, while the first engine has already been turned on, to allow the second engine to be started and to warm up and thermally stabilize before takeoff; and where, when the taxi path is a landing taxi path, the second engine may be turned off, while the first engine remains on, to allow the second engine to thermally stabilize after landing; and providing a signal indicating the zones.

The method may also include reducing a number of taxi paths in the plurality while the airplane is stationary to provide a reduced plurality of taxi paths.

Reducing the number of taxi paths may be based on an initial condition. The initial condition may include one or more of: an airport that the aircraft is at or is approaching; a specific runway at an airport; a runway entry at an airport; and, a gate or taxi stand at an airport.

Reducing the number of taxi paths may be based on an initial condition and a supplemental condition. The initial condition may be an airport that the aircraft is at or is approaching, a specific runway at an airport, a runway entry at an airport, a gate or taxi stand at an airport, or a combination of the foregoing. The supplemental condition may include one or more of: a visibility; an expected slope; a weather condition; a turning requirement; and an aircraft takeoff condition.

The method may also include displaying the plurality of taxi paths. The method may further include determining that the aircraft is moving and only displaying the plurality of taxi paths when it has been determined that the aircraft is not moving. Additionally and/or alternatively the method may include determining that the aircraft is moving, determining a position of the aircraft, and, reducing a number of taxi paths in the reduced plurality of taxi paths based on the determined position to provide a further reduced plurality of taxi paths. The position of the aircraft may be repeatedly determined and the number of taxi paths may be repeatedly reduced.

The method may include determining either that the second engine has been turned on or that the aircraft has landed. When it has been determined that the second engine has been turned on, the process may include determining a time remaining until the second engine has warmed up and is thermally stabilized. Further, when it has been determined that that the aircraft has landed, the process may include determining a time remaining until the second engine has thermally stabilized. It is contemplated that the time remaining is displayed. After it has been determined that the second engine has been turned on, and it has been further determined that the time remaining until the second engine has warmed up and is thermally stabilized is zero, the method may also include providing an indicator that the second engine is ready for takeoff When it has been determined that that the aircraft has landed and the time remaining until the second engine has thermally stabilized has been determined to be zero, the process may further include providing an indicator that the second engine has thermally stabilized and is safe to turn off In another aspect, the present invention is directed to a non-transitory computer readable medium storing instruction that when implanted carry out the steps of the present processes.

The non-transitory computer readable medium may be in an EFB, or in aircraft avionics, or in both.

In a further aspect of the present invention, the present invention may be broadly characterized as providing a system for aircraft taxiing and guidance having: a computer in communication with a database, the database storing data, the computer being configured to obtain the data from the database, and the computer comprising non-transitory computer readable media comprising computer executable instructions that when executed cause a processor to execute the following steps for operating an aircraft having a first engine and a second engine: determining a plurality of taxi paths for the aircraft to take, each path comprising a takeoff taxi path or a landing taxi path; and, determining a zone for each taxi path where, when the taxi path is a takeoff taxi path, the second engine may be turned on, while the first engine has already been turned on, to allow the second engine to be started and to warm up and thermally stabilize before takeoff; and where, when the taxi path is a landing taxi path, the second engine may be turned off, while the first engine remains on, to allow the second engine to thermally stabilize after landing.

The system may further include a display device in communication with the computer, the display device configured to providing a signal indicating the zones Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION

As discussed above, the present invention is utilized in determining when it is safe to operate an aircraft in SET IN and SET OUT. Operating in SET reduces fuel consumption and allows for a more efficient and efficient operation of the aircraft in general. The present invention allows SET IN and SET OUT to be more readily utilized.

With these general principles in mind, one or more embodiments of the present invention will be described with the understanding that the following description is not intended to be limiting.

As mentioned above, the present invention may be utilized in either SET IN or SET OUT operations. In either case, a process according to the present invention includes determining a plurality of taxi paths for the aircraft to take, determining a zone for each taxi path where to start or stop the second engine, and providing a signal indicating the zones.

Figure 1:
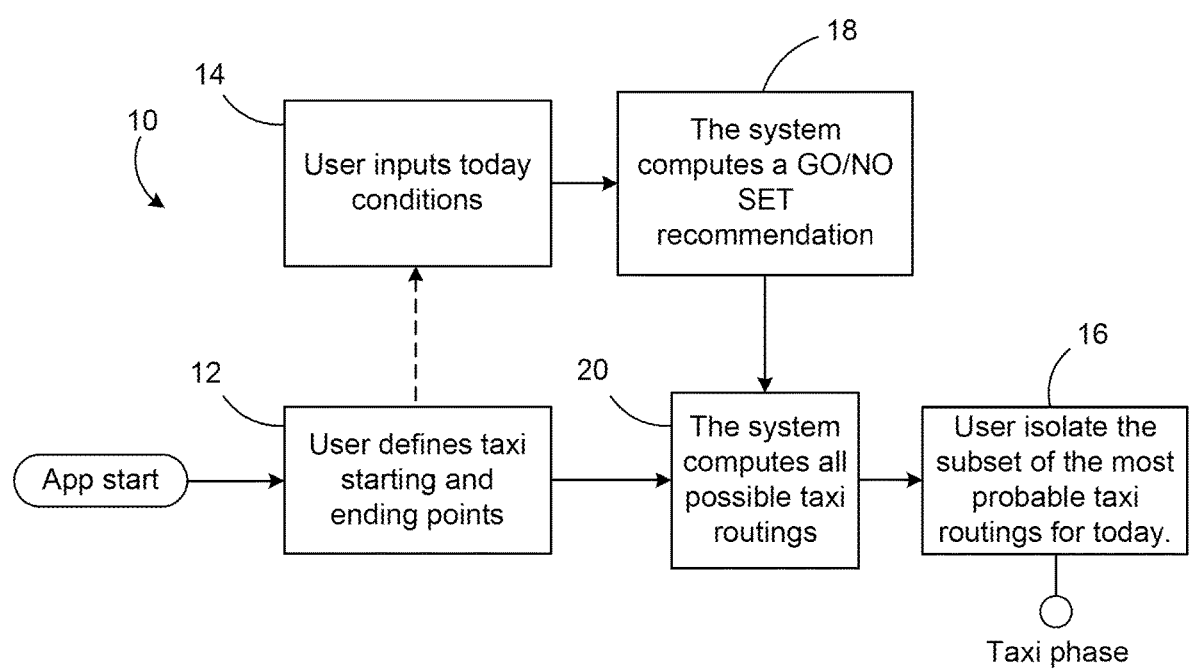
FIG. 1 is portion of a process flow diagram showing a portion of one or more aspects of the present processes.
Figure 4A:
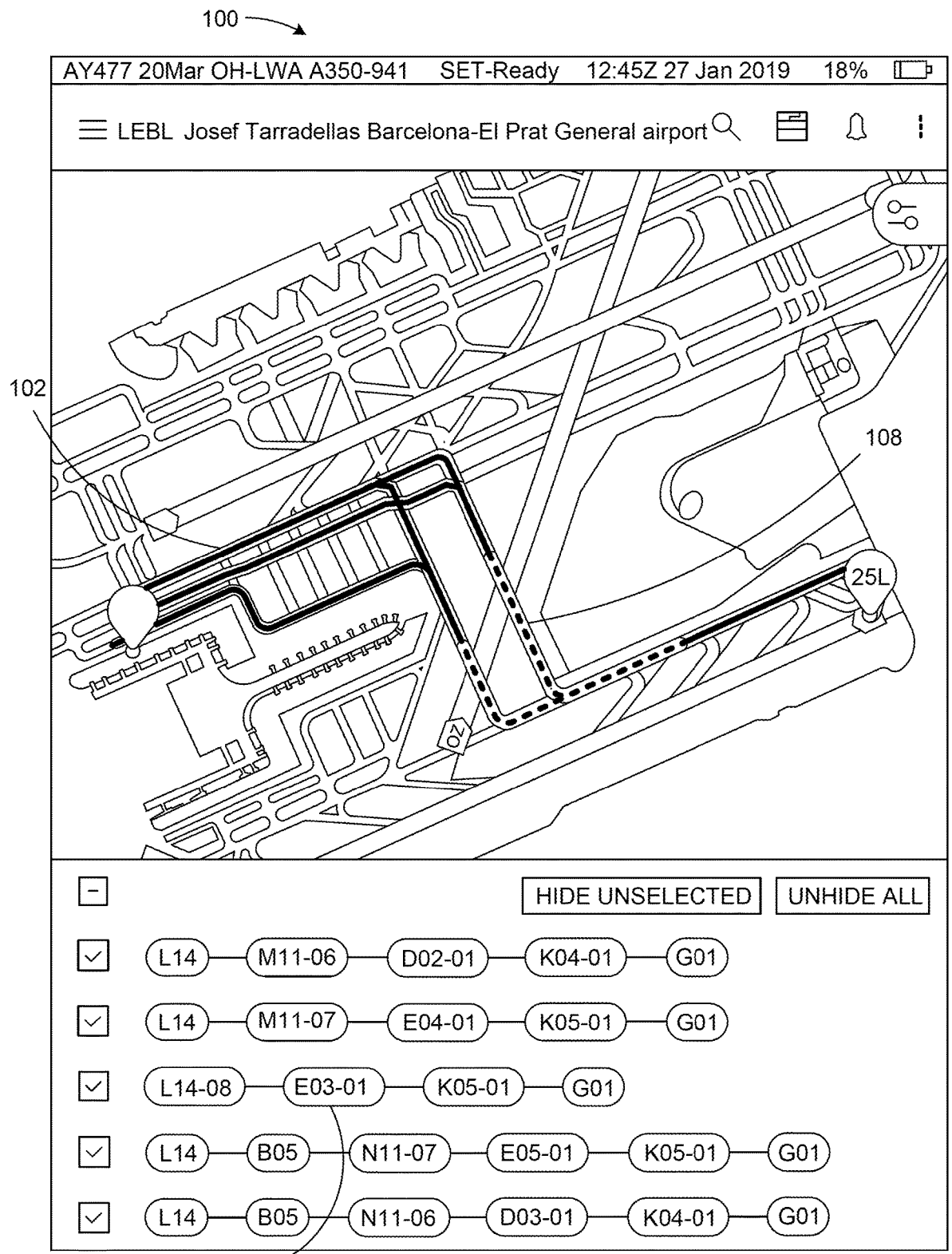
FIG. 4A depicts a display screen showing multiple taxi routes according to one or more aspects of the present invention.

Turning to FIG. 1, for SET OUT operations, the present invention provides one or more processes 10 which allows the flight crew to visualize all possible taxi paths, which may be based on an initial condition 12, such as a gate, or specific runway. An example display 100 is shown in FIG. 4A, which depicts five possible taxi paths 102 on a map and includes a list 104 of same.

Returning to FIG. 1, for each path, the zone to start the second engine will be determined and may be displayed on a display in the cockpit or on the EFB. This zone is based on taxi distance and aircraft expected speed and historical data for traffic. The present processes 10 may also include predicting and indicating, based on historical data, which are the most probable taxi routings for today. The historical data could be compiled over years, or over days, or over hours, or contemporaneously when the process begins for a particular aircraft. This visualization is intended to be purely for briefing purposes.

Optionally, various supplemental conditions 14 can be inputted, automatically or manually, which can be, for example, specific weather conditions, and which may include a recommendation not to use SET on a particular day with a particular set of conditions.

More specifically, in the present processes, a number of potential taxi paths may be reduced. Any potential taxi paths may be eliminated if it is known that an aircraft will not use that taxi path 16. Additionally, or alternatively, a set of potential taxi path may be selected.

The reduction may be based initial condition 12, such as an airport that the aircraft is at, a specific runway at an airport, a runway entry at an airport, a gate or taxi stand at an airport, a combination of the foregoing. The reduction may also be based on supplemental conditions 14, which may include a visibility, an expected slope, a weather condition, a turning requirement, an aircraft takeoff condition or, a combination of the foregoing. One or more of the conditions may be used to determine 18 that SET operations are not recommended.

Figure 3C:
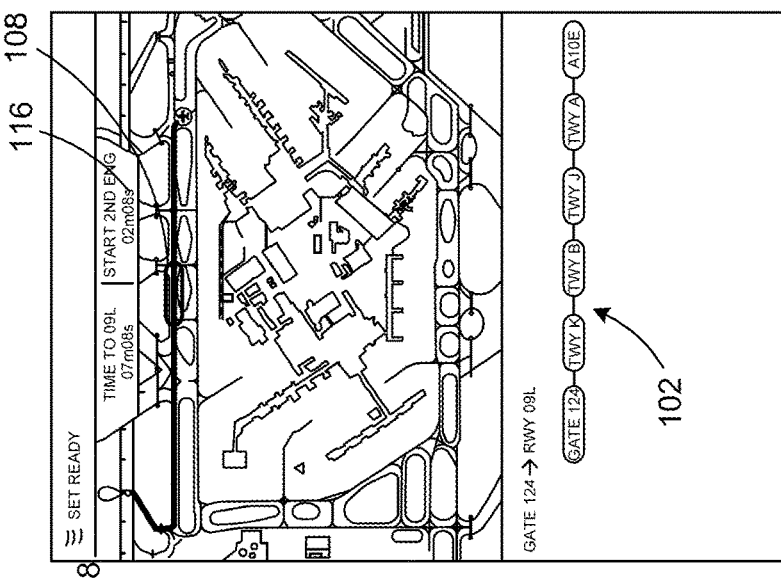
FIG. 3C shows an exemplary display according to one step in a process according to the present invention.
Figure 3B:
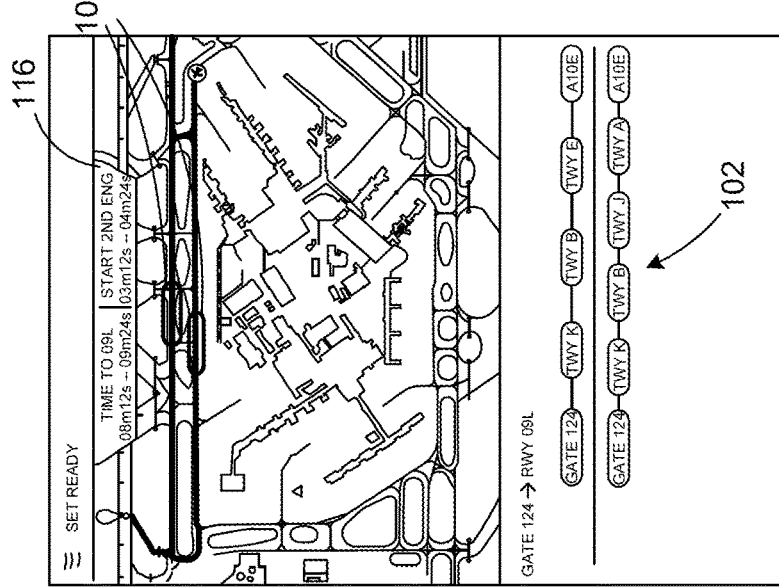
FIG. 3B shows an exemplary display according to one step in a process according to the present invention.
Figure 3A:
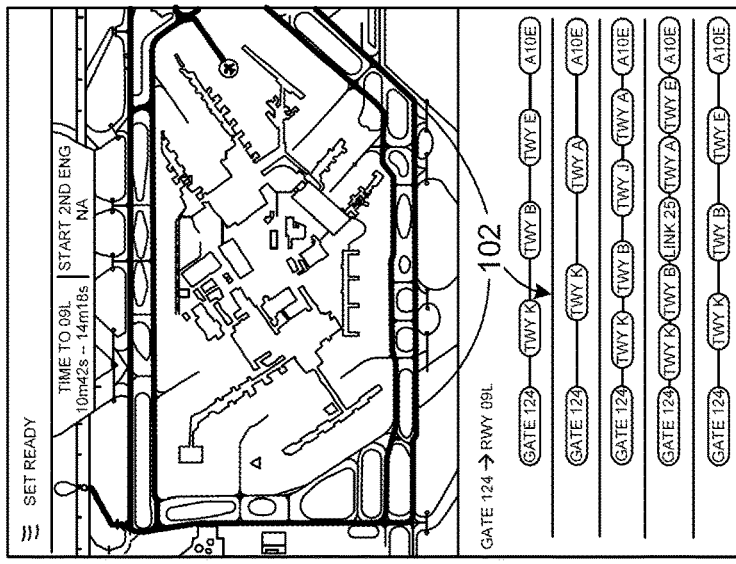
FIG. 3A shows an exemplary display according to one step in a process according to the present invention.
Figure 4B:
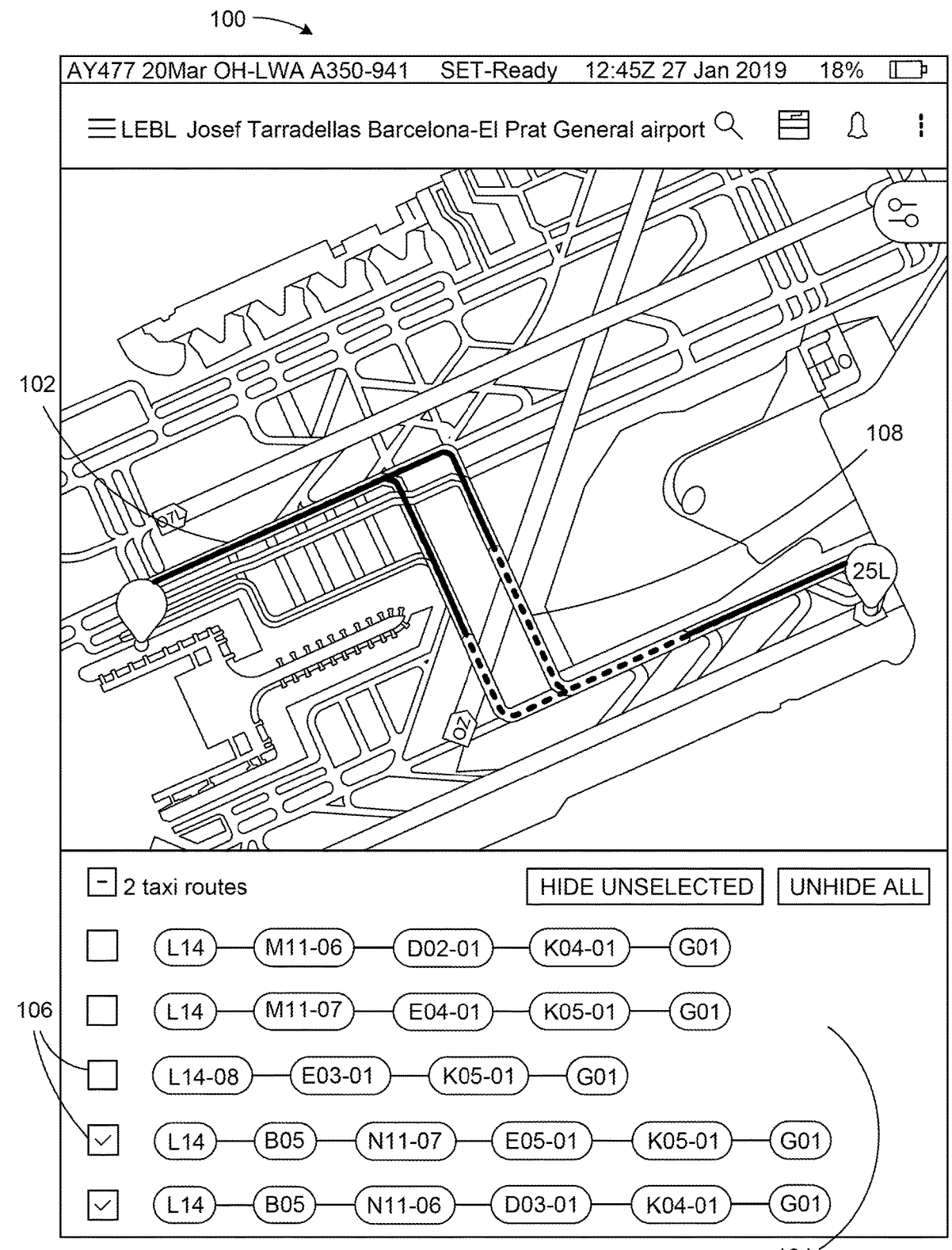
FIG. 4B depicts a display screen showing a reduced number of taxi routes according to one or more aspects of the present invention.

After one or more reductions, as shown in FIG. 3A, one or more of the remaining taxi paths 100 may be displayed on a screen 102, preferably a map or in a list. For each displayed taxi path, the processes determine 18 a zone for starting the second engine, discussed in more detail below. As shown in FIG. 4B, only two taxi paths 102 are shown on the map in the display 102 but the others remain in the list 104. The reduction may be done manually by selection of checkboxes 106 in the list 104 next to each taxi path 102.

Figure 2:
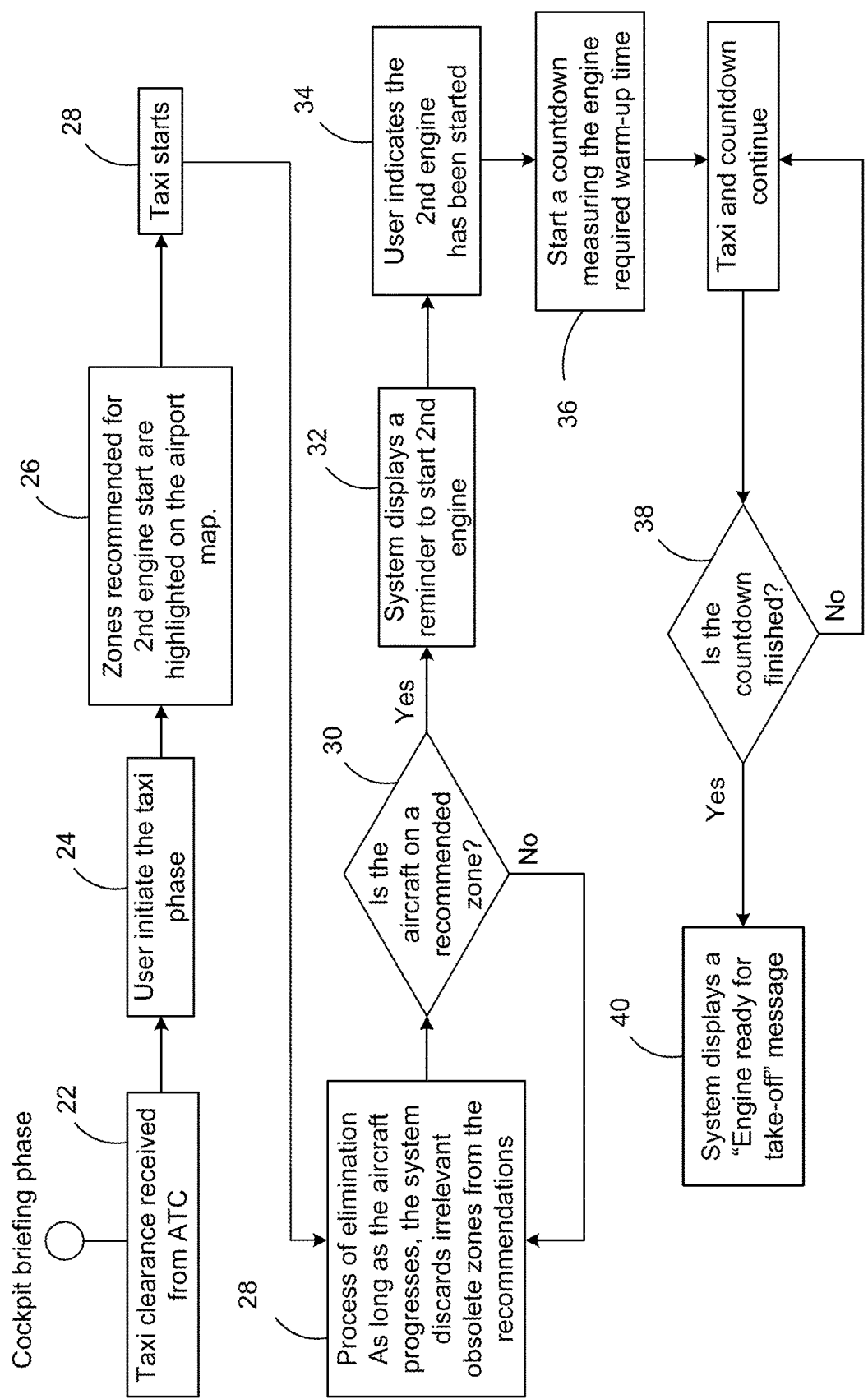
FIG. 2 is a second portion of the process flow diagram of FIG. 1.

Turning to FIG. 2, at some point, the aircraft is provided with taxi clearance 22. This may be determined automatically by the process, or it may be manually entered 24. The aircraft begins taxi operations (movement) 28 and will begin to taxi away from the gate.

Figure 4C:
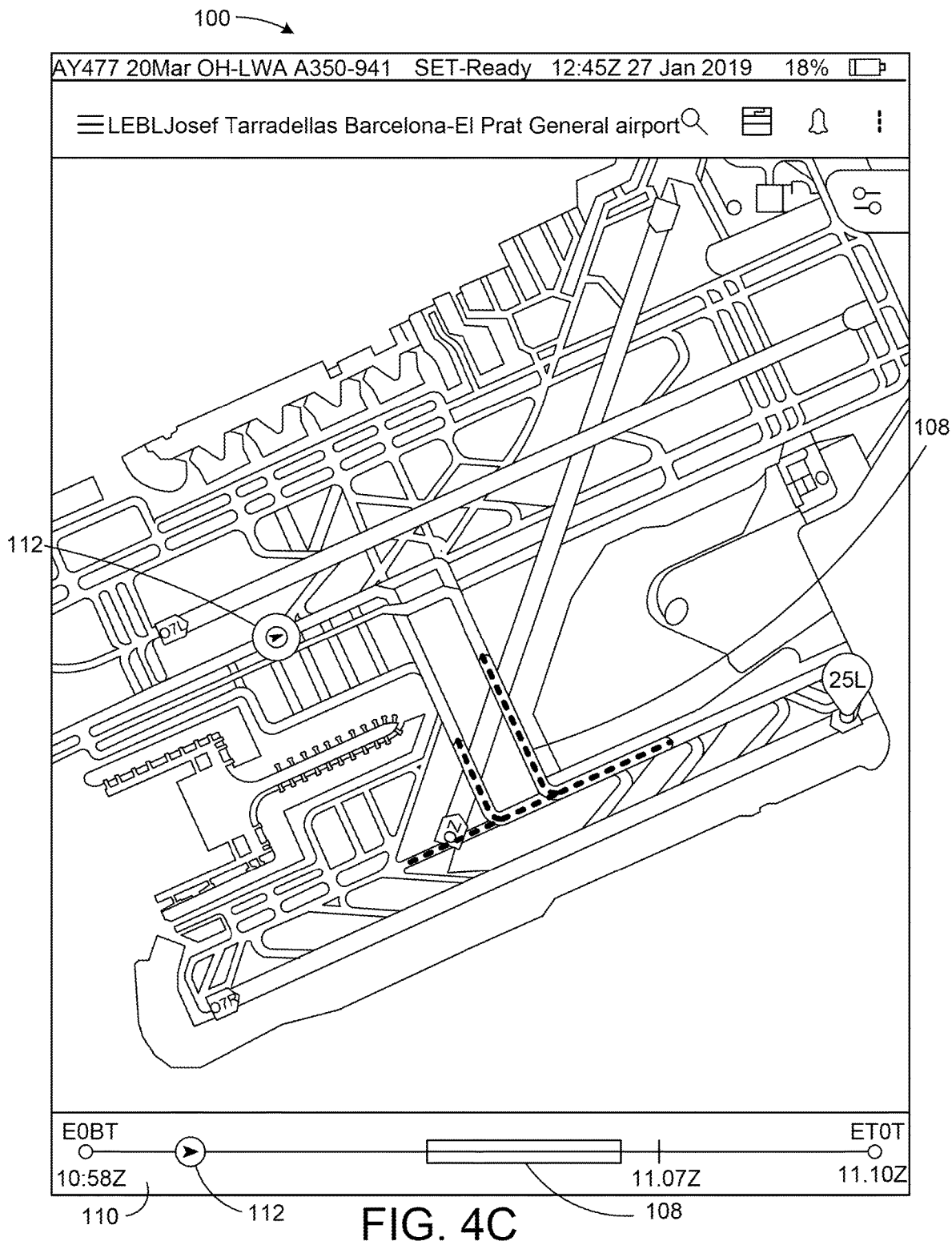
FIG. 4C depicts a display screen showing a possible zones for starting the engine according to one or more aspects of the present invention.
Figure 4D:
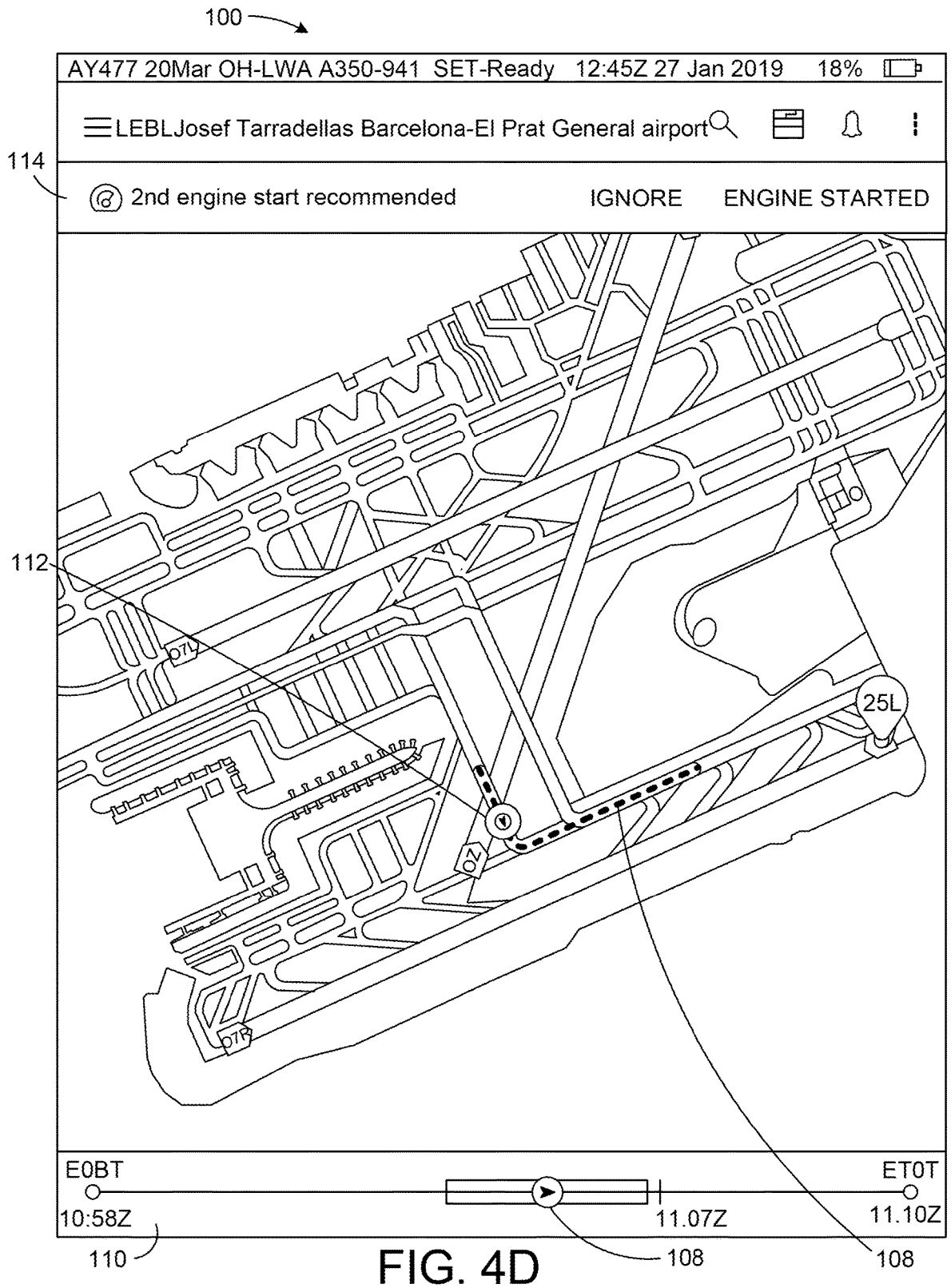
FIG. 4D depicts a display screen showing an aircraft positioned in a zone for starting the engine according to one or more aspects of the present invention with an indicator.
Figure 4E:
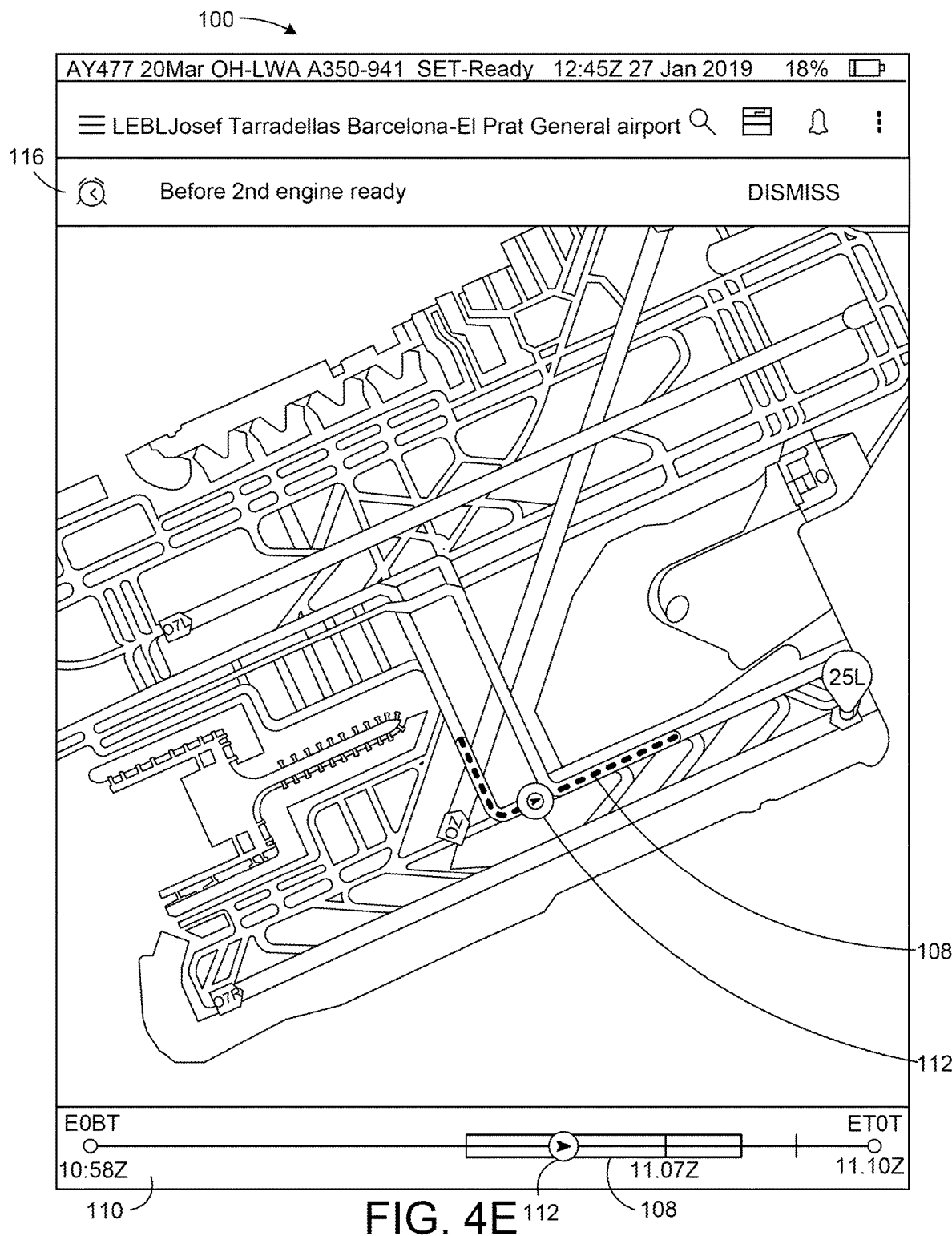
FIG. 4E depicts a display screen showing a countdown timer according to one or more aspects of the present invention.
Figure 4F:
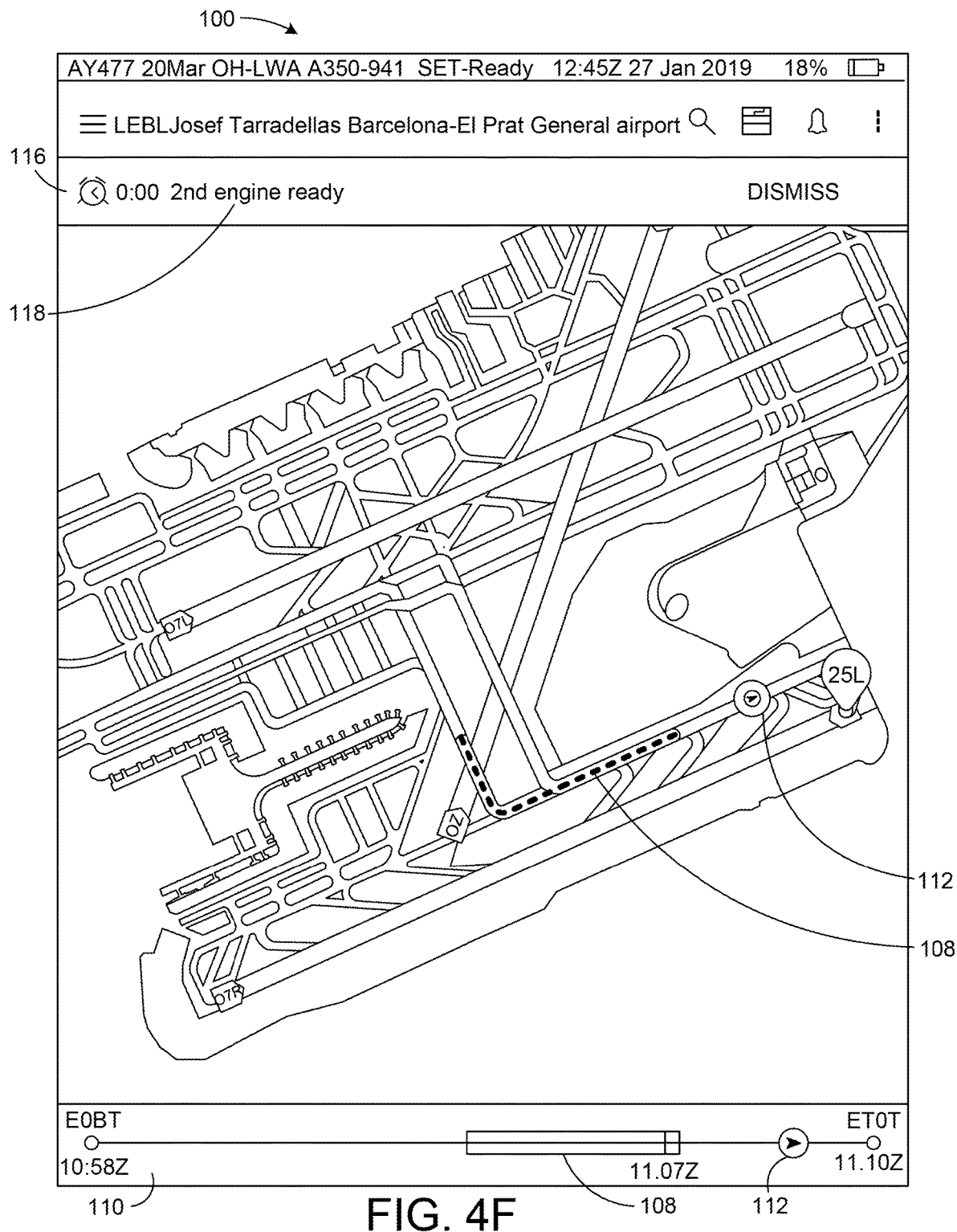
FIG. 4F depicts a display screen showing an indicator that the second engine is ready for take-off.
Figure 4G:
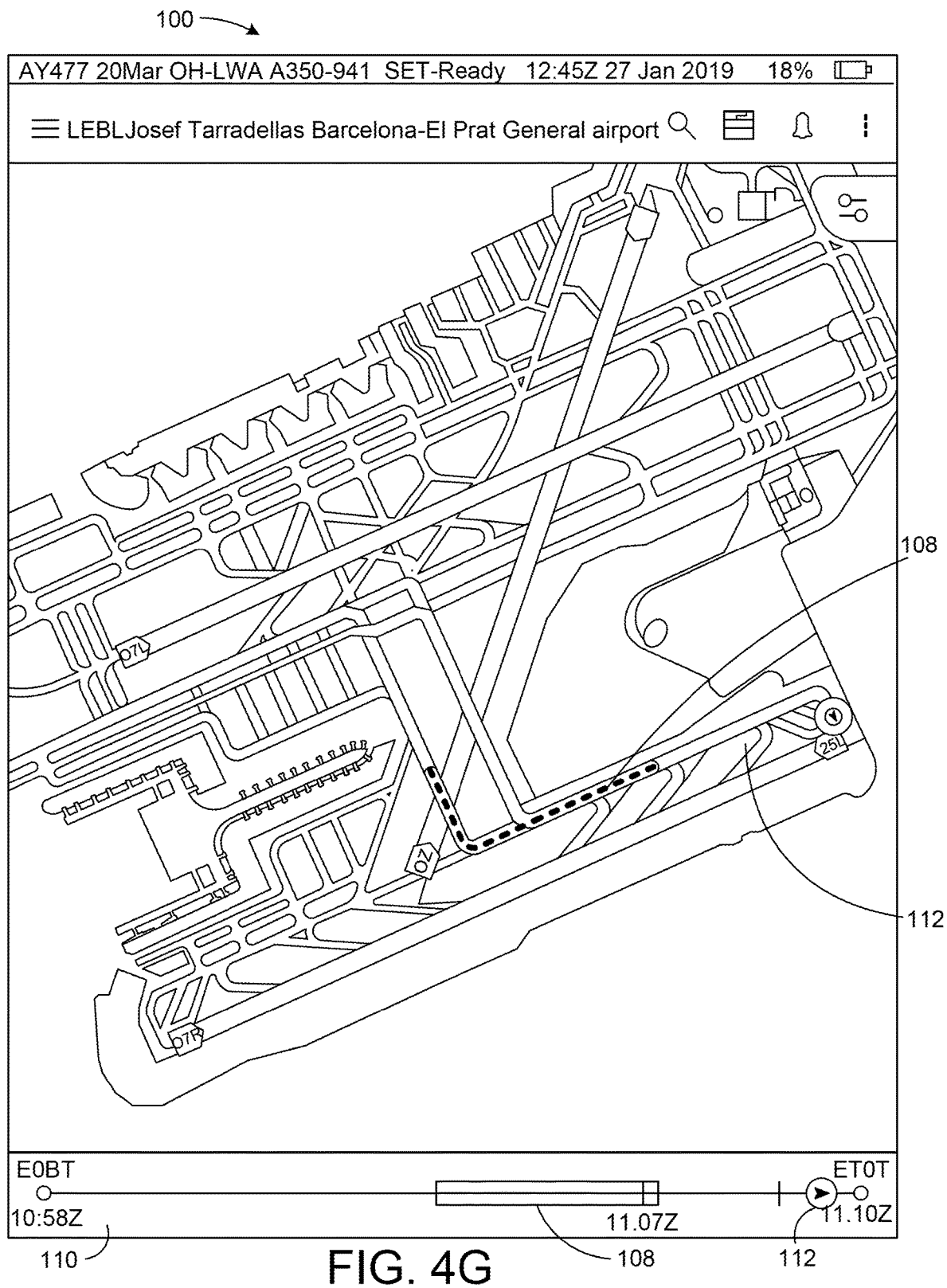
FIG. 4G depicts a display screen according to one or more aspects of the present invention after completion of the SET out process.

Turning to FIGS. 3B and 3C, once the aircraft is moving, it is preferred that the no taxi paths are displayed. Rather, as shown in FIG. 4C, only the zones 108 to start the second engine are displayed 26 and continuously refined or reduced as long as the aircraft is taxiing by process of elimination of irrelevant obsolete taxiways 28. The display, as shown in FIGS. 4C to 4G, may include a timeline 110 which shows the progress of the aircraft, as an icon 112, and may also display the position of the aircraft and the determined zone 108. The position of the aircraft may be obtained using a global positioning system (GPS) and may be based on information from an avionics computer on the aircraft. Although it is discussed that no path is shown, this is merely one embodiment, and it should be appreciated that one or more paths may indeed be indicated in the present invention while the aircraft is moving.

For example, if the aircraft is assigned a taxi path and that information is provided to the present processes, the assigned taxi path may be indicated on the display while the aircraft is moving.

As the aircraft is moving, at each node (intersection, or some other taxi map feature) decisions are being made based on the clearance which results in the aircraft maneuvering (moving) along the taxiways. The present processes iteratively determine the position of the aircraft, via received position data or based on heading and speed data that is provided. Based on the path travelled (or being travelled), alternative routes (which would have required a different path) are eliminated. Once a taxi path has been eliminated, the corresponding zone is removed from display.

When it is determined 30 the aircraft is within the recommended zone, the processes may include displaying 32 a message 114 (see, FIG. 4D) to remind the crew to start the second engine.

If the second engine has not been started after entering the recommended zone, 108 as the aircraft progresses through a level of the encouragement signal may be increased (i.e., an auditory signal may be louder, a displayed signal may increase in size or change color).

Once the second engine has been started, a countdown timer 116 (see, FIGS. 3B, 3C, and 4E C) begins 36 that uses internally stored variables to determine a thermal stabilization time for the second engine. The process may determine that the second engine has started automatically, or it may be manually entered 34. The countdown timer 116 may be displayed on the screen. See, FIGS. 4F and 4G. Once it has been determined 38 that the timer is zero, an indicator 118 may be provided 40 indicating that the second engine, and thus the aircraft, is ready for takeoff For each taxi path there are multiple ways that the process may determine the zone associated with the taxi path. For example, the airport may have areas on the taxiway/runways where the engines cannot be started/stopped. Additionally, the process may not allow an engine to be started/stopped when travelling around a corner. The process may remove these areas from being zones.

The present processes predict the zones based on estimated speeds, and thus distance, beyond the point of engine start (for taxi out) as this mainly determines if the engine is warmed up enough by the time the runway is reached.

The distances of the taxiways are known. Additionally, the present processes may utilize preset, fixed range of minimum taxi speed and maximum taxi speed. Additionally, the processes utilize time thresholds for the engine warm up time.

A beginning of the zone may be determined by utilizing the fastest taxi speed (because to travel from this area to the runway will take less time) and an end of the zone may be determined by utilizing the slowest taxi speed. An additional amount of time/distance may be added to ensure the engine has a very high probability of being warmed up in time.

The zones may be calculated by moving backwards from the runway along each taxiway possibility and converting the engine time, plus margin, to a distance using the relevant aircraft speed.

Close to the runways there will also be multiple runway entry points. The process will not know which entry point will be used. In this case, the process is likely to have many overlapping recommended zones along the taxiways that lead to these entry points. A worst case scenario will always be used when the process lacks specific information about which future taxi path will be taken and the zones are overlapping. However, one of the runway entry points may be manually selected based on a strategy to perform short or long (flex/derated) distance take-off and on the traffic of the same wake-vortex categories (5 wake vortex categories available from ADS-B periodic reports received from other traffic) as the aircraft is depicted on the airport moving map Additionally, each airport/aircraft type may have specific or custom minimum and maximum speeds based on manual input (just an estimate or calculated with historic data) or calculated from historic data automatically. This may be expanded to be per day/hour/season based on analyzing data to find trends. Analyzing the data may also reveal there is no patterns and making these settings is not useful.

The present processes may also utilize recent "live" data to predict the taxi speed on the taxiways where data is available. This prediction can add information to the zone. It could either define it or add another display (color) to help indicate the most likely area within the speed range they will have. The recent "live" data is the recent speed of aircraft in the areas close to the runway. Since this is the "area" of the taxiway that drives the distance required for engine thermal stabilization.

The present processes may also measure and utilize the actual taxi speed of the aircraft. This could predict within the low/high zone the best location based on the average taxi speed so far. When the aircraft slows below a certain speed, the actual speed measurement may be removed from the determination.

The zone for each taxiway may also be determined purely by historic data. In other words, the determined zones may not be based on the actual or determined speed of the aircraft. The historical data may include any of the following: type of aircraft, type of engines, airport, taxi route, speed, recommended engine warm up time, weather, average of past positions where former aircrafts turned on the engine, last acceptable position, first acceptable position. This may also include based on airport traffic and type of traffic (3 aircraft wake vortex categories), aircraft speed, aircraft weight, engine status, and temperature.

For a SET IN operation, the present processes are similar Prior to landing, the processes may display one or taxi paths for a pair of runway and gate. For each routing, the processes may display the determined zone to shut down the second engine. This determined zone is based on taxi distance and aircraft expected speed. Additionally, the processes may indicate, based on historical data, the most probable taxi routings for today.

Once the aircraft has landed, it is preferred that the processes does not display the taxi paths. However, the determined zones to shut down the second engine are displayed and continuously reduced, or refined, as long as the aircraft is taxiing by process of elimination of irrelevant obsolete taxiways. Additionally, as soon as the aircraft has landed, the present processes start a countdown measuring the mandatory cool downtime and display a message reminding the crew to shut down the second engine when the countdown is over. In the SET IN case, the zones are typically determined by timing after landing rather than by location.

Traffic may also be displayed in some form on the map. Weather and other environmental data such as runway condition and visibility may also be displayed to help make the decision it is safe for SET operations. The airports SET policy may also be displayed. Statistical data about the airline or fleet may also be displayed to show the typical behavior at that airport for SET IN. After second engine shutdown, an estimate of the taxi time remaining could track the fuel saved providing a short summary once the aircraft reaches the gate.

In either SET IN or SET OUT operations, the present processes also contemplate using a text message, alone or in combination with the displaying of indications. For example, the text message may replace the airport moving map. This message could appear on an EFB application, on an aircraft text display such as ACARS or even on smartphones.

Figure 5:
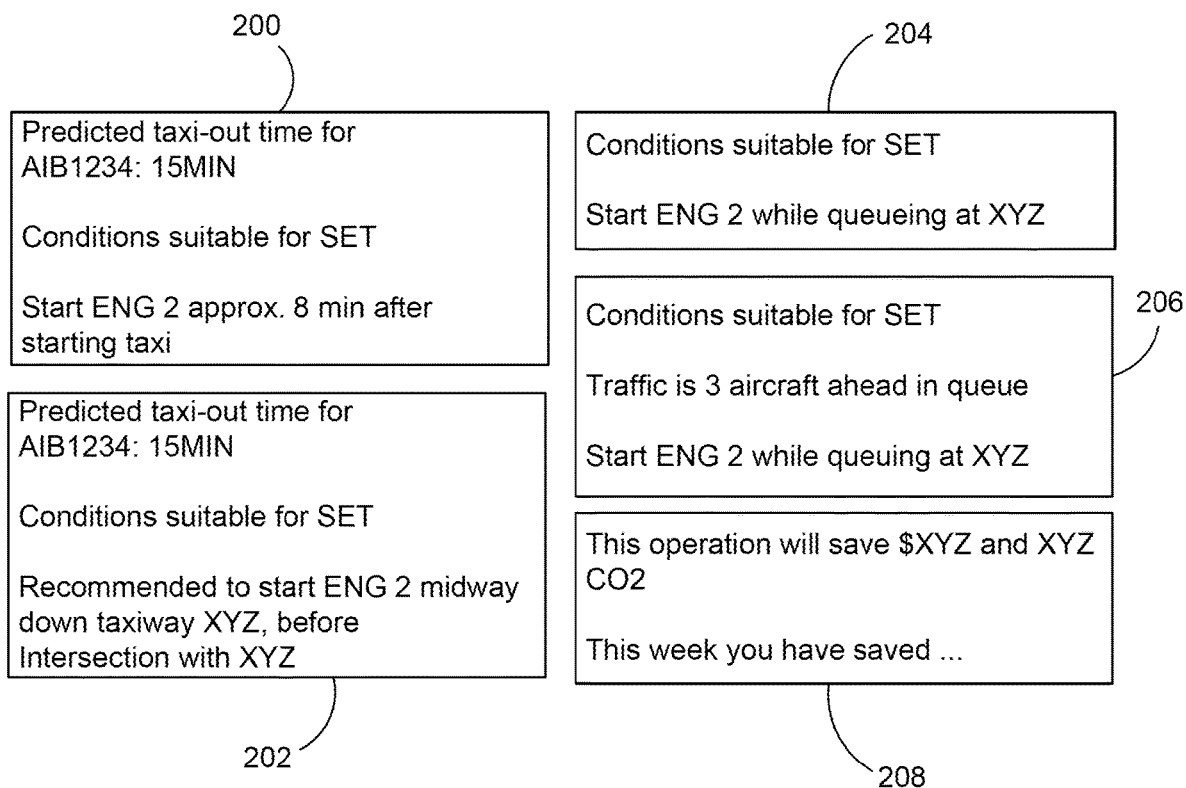
FIG. 5 depict various text messages that may be provided in accordance with one or more aspects of the present invention.

Exemplary text messages 200, 202, 204, 206, 208 are shown in FIG. 5. The text messages 200, 202 can include a predicted taxi out path, taxi out time, indicate that conditions are suitable or acceptable for SET operations, and indicate an ideal position to start the second engine. Similarly, it is contemplated that the text message 204 merely indicates that conditions are suitable or acceptable for SET operations, and further indicates an ideal position to start the second engine. The text message 206 may also include information about taxiing conditions. Moreover, the text message 208 may include feedback about the use of SET operations to encourage the pilot to use SET operations when taxiing. Multiple text messages 200, 202, 204, 206, 208 may be sent and the messages may include different data. For example, a text message could be sent once it has been determined that the second engine is thermally stabilized.

Additionally, in the present processes, a timer may be integrated into the aircraft avionics that is triggered based on specific aircraft events. The aircraft events are determined by the avionics and received aircraft data. Typically, this data will be booleans (true/false) or in some cases it may be an integer or float that would require a threshold to pass to trigger the timer.

Instead of a timer, the present processes may utilize a sensed thermal stabilization. A sensed thermal stabilization means that certain internal data in the engines (such as oil temperature) may be used in the present processes to determine that the engine has warmed up or cooled down sufficiently. This could potentially remove time as a factor or considering the environment or context. The sensed thermal stabilization is believed to be the most direct and accurate form of determining if the engine is thermally stabilized.

Additionally, the present processes may provide past taxi operations at a given airport and under given criteria that a user could filter down through. The exact criteria may be determined by the journey that is desired or undertaken.

In sum, with the present processes, SET IN and SET OUT operations may be performed more accurately and more often.

Figure 6:
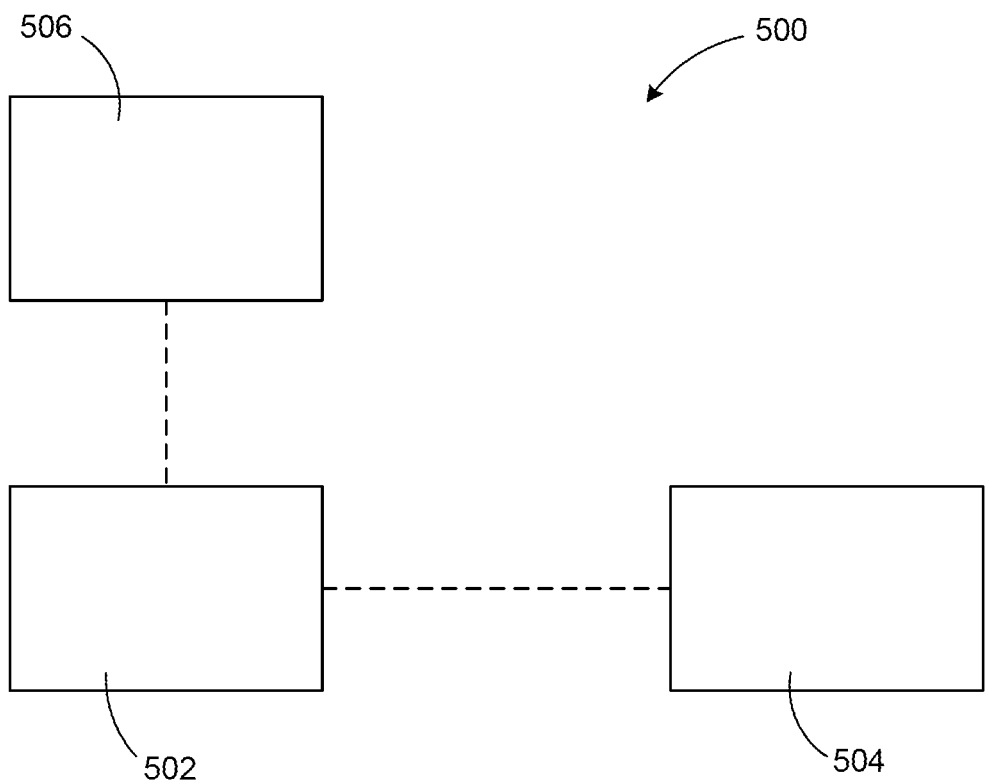
FIG. 6 is a schematic diagram of a system according to one or more aspects of the present invention.

Turning to FIG. 6, a system according to the present invention is depicted. As illustrated, the system 500 includes a computer 502 (e.g., a mobile computing system, an aircraft cockpit system, an aircraft navigation system, etc.). The computer 502 is in communication 504 with a database storing data which may include taxiway data (historical and/or live), connecting flight data, aircraft logbook data, pilot request form, airport terminal information data and other relevant data associated with the aircraft and the airport. When the communication link is established, the computer 502 may access data from the database 504 and perform one or more steps of the present processes. The computer 506 is also in communication with a display device 506 which may be a touch screen display.

The computer 502, in the form of a personal computer or a mobile device may include a processor, memory, a removable storage, and a non-removable storage. The computer 502 may additionally include a bus and a network interface. The computer 502 may include or have access to the computing system environment that includes one or more user input devices, one or more output devices, and one or more communication connections such as a network interface card or a universal serial bus connection.

The one or more user input devices may be a digitizer screen and a stylus, trackball, keyboard, keypad, mouse, and the like. The one or more output devices may be the display device 506, which may be a display device of a personal computer, a mobile device, an aircraft cockpit system, an aircraft navigation system, and the like. The communication connections may include a local area network, a wide area network, and/or other networks.

The memory may include volatile memory and non-volatile memory. A variety of computer-readable storage media may be stored in and accessed from the memory elements of the computing system, such as the volatile memory and the non-volatile memory, the removable storage and the non-removable storage. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor of the computer 502.

For example, a computer program may include machine-readable instructions capable of determining likely taxi routes and determining zones or areas to start the second engine, using a communication network, according to the teachings and herein described embodiments of the present subject matter. In one embodiment, the computer program may be included on a compact disk-read only memory (CD-ROM) and loaded from the CD-ROM to a hard drive in the non-volatile memory. The machine-readable instructions may cause the computer 502 to encode according to the various embodiments of the present subject matter.

In general, the computer 502 has stored therein computer-executable instructions for implementing the processes described herein and may comprise any suitable devices configured to cause a series of steps to be performed so as to implement the method such that instructions, when executed by the computer 502 or other programmable apparatus, may cause the functions/acts/steps specified in the methods described herein to be executed. Thus, the computer 502 may include any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In sum, with the present processes, SET IN and SET OUT operations may be performed more accurately and more often.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating an aircraft having a first engine and a second engine, the method comprising:
    determining a plurality of taxi paths for the aircraft to take, each path comprising a takeoff taxi path or a landing taxi path;
    determining a zone for each taxi path where, when the taxi path is a takeoff taxi path, the first engine is on and the second engine is turned on, to allow the second engine to be started and to warm up and thermally stabilize before takeoff, and where, when the taxi path is a landing taxi path, the first engine remains on while the second engine is turned off, to allow the second engine to thermally stabilize after landing;
    determining whether the second engine can be turned on along the takeoff taxi path and whether the second engine can be turned off along the landing taxi path;
    providing a signal indicating the zones;
    turning on the second engine along the takeoff taxi path when it is determined that the second engine can be turned on; and
    turning off the second engine along the landing taxi path when it is determined that the second engine can be turned off.

2. The method according to claim 1, further comprising:
    reducing a number of taxi paths in the plurality while the airplane is stationary to provide a reduced plurality of taxi paths.

3. The method according to claim 2, wherein the reducing the number of taxi paths is based on an initial condition.

4. The method according to claim 3, wherein the initial condition comprises:
    an airport that the aircraft is at or is approaching;

a specific runway at an airport;
a runway entry at an airport;
a gate or taxi stand at an airport; or
a combination of the foregoing.

5. The method according to claim 2, wherein the reducing the number of taxi paths is based on an initial condition and a supplemental condition.

6. The method according to claim 5, wherein the initial condition comprises an airport that the aircraft is at or is approaching, a specific runway at an airport, a runway entry at an airport, a gate or taxi stand at an airport or a combination of the foregoing, and
wherein the supplemental condition comprises:
a visibility;
an expected slope;
a weather condition;
a turning requirement;
an aircraft takeoff condition; or
a combination of the foregoing.

7. The method according to claim 2, further comprising:
displaying the plurality of taxi paths.

8. The method according to claim 7, further comprising:
determining that the aircraft is moving; and,
only displaying the plurality of taxi paths when it has been determined that the aircraft is not moving.

9. The method according to claim 2, further comprising:
determining that the aircraft is moving;
determining a position of the aircraft; and,
reducing a number of taxi paths in the reduced plurality of taxi paths based on the determined position to provide a further reduced plurality of taxi paths.

10. The method according to claim 9, wherein the position of the aircraft is repeatedly determined and the number of taxi paths is repeatedly reduced.

11. The method according to claim 2, further comprising:
determining either that the second engine has been turned on or that the aircraft has landed; and,
when it has been determined that the second engine has been turned on, determining a time remaining until the second engine has warmed up and is thermally stabilize; and,
when it has been determined that the aircraft has landed, determining a time remaining until the second engine has thermally stabilized.

12. The method according to claim 11, further comprising:
displaying the time remaining.

13. The method according to claim 11, further comprising:
when it has been determined that the second engine has been turned on and the time remaining until the second engine has warmed up and is thermally stabilize has been determined to be zero,
providing an indicator that the second engine is ready for takeoff.

14. The method according to claim 11, further comprising:
when it has been determined that that the aircraft has landed and the time remaining until the second engine has thermally stabilized has been determined to be zero,
providing an indicator that the second engine has thermally stabilized and is safe to turn off.

15. A non-transitory computer readable media comprising computer executable instructions that when executed cause a processor to execute the steps of the method according to claim 1.

16. A system for aircraft taxiing and guidance, comprising:
a computer in communication with a database,
the database storing data,
the computer being configured to obtain the data from the database, and the computer comprising non-transitory computer readable media comprising computer executable instructions that when executed cause a processor to execute the following steps for operating an aircraft having a first engine and a second engine:
determining a plurality of taxi paths for the aircraft to take, each path comprising a takeoff taxi path or a landing taxi path;
determining a zone for each taxi path where, when the taxi path is a takeoff taxi path, the first engine is on and the second engine is turned on, to allow the second engine to be started and to warm up and thermally stabilize before takeoff, and where, when the taxi path is a landing taxi path, the first engine remains on while the second engine is turned off, to allow the second engine to thermally stabilize after landing;
determining whether the second engine can be turned on along the takeoff taxi path and whether the second engine can be turned off along the landing taxi path;
turning on the second engine along the takeoff taxi path when it is determined that the second engine can be turned on; and
turning off the second engine along the landing taxi path when it is determined that the second engine can be turned off.

17. The system of claim 16 further comprising:
a display device in communication with the computer, the display device configured to providing a signal indicating the zones.

* * * * *